Figure 1:
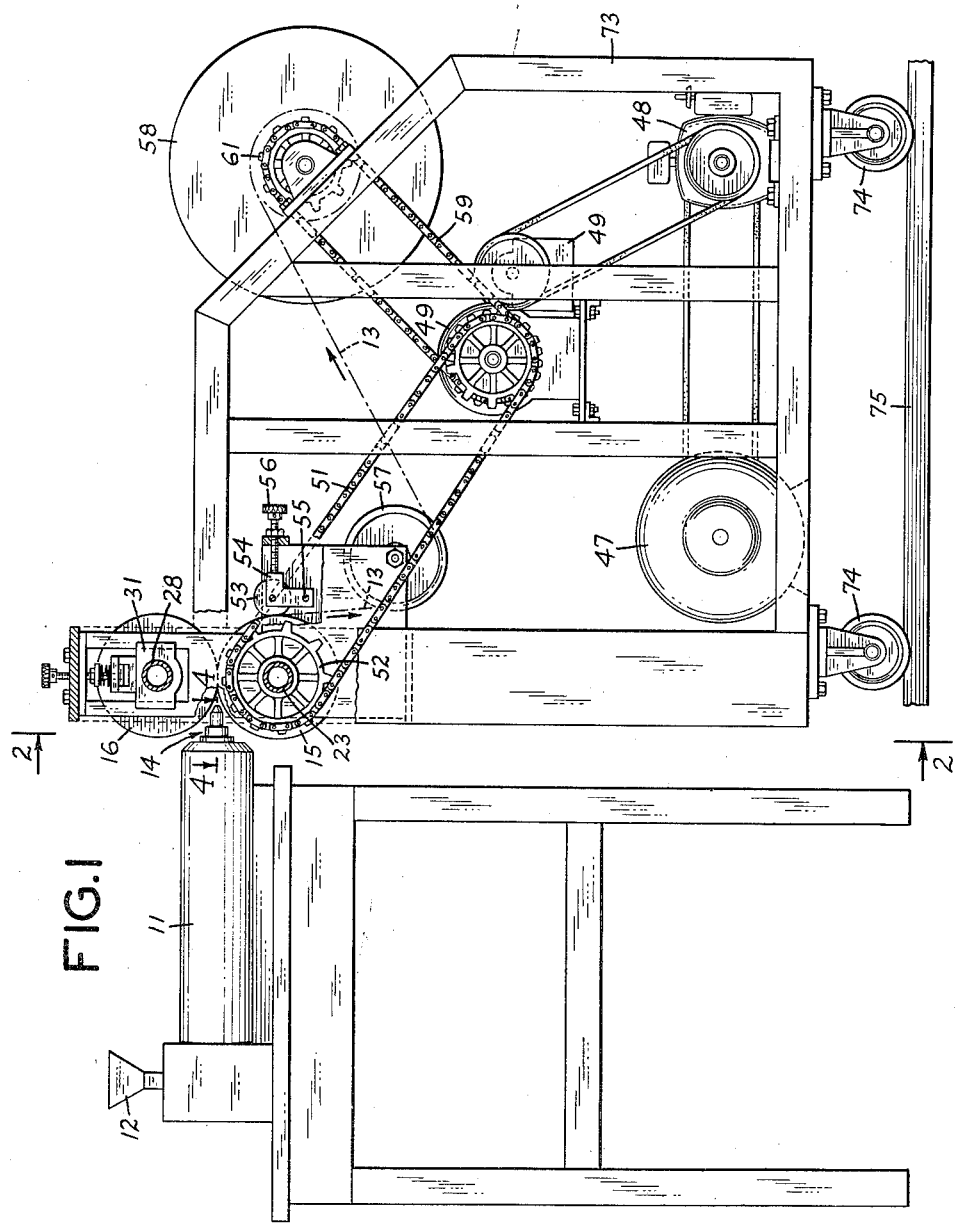

June 17, 1952    R. P. PIPEROUX ET AL    2,600,686
APPARATUS AND PROCESS FOR PREPARING
BANDS FROM THERMOPLASTIC MATERIAL Filed June 29, 1949    3 Sheets-Sheet 1

INVENTORS.
RENE P. PIPEROUX
DAVID B. HERTZ
FRANK M. CULPEPPER
BY
ATTORNEYS

June 17, 1952

R. P. PIPEROUX ET AL 2,600,686

APPARATUS AND PROCESS FOR PREPARING
BANDS FROM THERMOPLASTIC MATERIAL

Filed June 29, 1949

3 Sheets-Sheet 3

INVENTORS.
RENE P. PIPEROUX
DAVID B. HERTZ
FRANK M. CULPEPPER

BY
ATTORNEYS

UNITED STATES PATENT OFFICE 2,600,686

APPARATUS AND PROCESS FOR PREPARING BANDS FROM THERMOPLASTIC MATERIAL

Rene P. Piperoux, Radburn, N. J., David B. Hertz, New York, N. Y., and Frank M. Culpepper, Newark, N. J., assignors to Celanese Corporation of America, New York, N. Y., a corporation of Delaware Application June 29, 1949, Serial No. 102,126

4 Claims. (Cl. 18—10)

This invention relates to the preparation of bands from thermoplastic material, and relates more particularly to an improved process and apparatus for the preparation of bands from thermoplastic material, which bands have a minimum variation in properties along their length.

When bands of rectangular or other desired cross-section are prepared from thermoplastic materials by the processes hitherto employed for this purpose, such as extrusion, for example, the finished bands exhibit a considerable variation in mechanical or dimensional properties along their length. The bands frequently warp, have surface imperfections, and the width and the thickness of the bands vary in an irregular manner causing the weight of the bands per unit length to fluctuate over a wide range. These characteristics render the bands commercially unacceptable for certain applications.

It is an important object of this invention to provide a novel process and apparatus for preparing bands which will be free from the foregoing and other disadvantages of the bands formed by prior processes.

A further object of this invention is to provide a novel process and apparatus for the preparation of bands having a minimum variation in properties along their length from thermoplastic materials.

Other objects of this invention, together with certain details of construction and combinations of parts, will be apparent from the following detailed description and claims.

In accordance with our invention, we prepare bands by forcing a thermoplastic material through a die containing an aperture to shape the same into a band having a cross-section larger than that desired in the finished band and containing an excess of the thermoplastic material, further shaping the band while the thermoplastic material is still in the plastic state by passing the same between a rotating casting wheel and compression roll which together define a shaping opening having the cross-section desired in the finished band and which are provided with means for trimming the excess thermoplastic material from the band as it is shaped, cooling the band while it is supported on the casting wheel until the thermoplastic material is set and the band is no longer subject to deformation by mechanical stress, and then removing the band from the casting wheel. We have found that by having an initial excess of thermoplastic material in the band, any irregularities in the feed of said material will not produce variations in the finished band, but will simply cause a smaller or greater quantity of thermoplastic material to be trimmed from the band.

The thermoplastic material may be forced through the aperture which shapes it into a band in any desired manner. It may, for example, be extruded through said aperture with a conventional extrusion apparatus. Alternatively, the thermoplastic material may be heated until it melts and the molten thermoplastic material forced through the aperture by means of a pressure applied to the material in any one of a number of suitable ways, such as, for example a piston, gas pressure, etc. The shape of the aperture, while not critical, should approximate that required in the finished band so that a minimum of shaping is required as the band passes between the casting wheel and the compression roll.

The shaping opening defined by the casting wheel and the compression roll may be formed entirely in one or the other of said members, or it may be formed in part in each of said members. However, for the production of bands having the least variation in properties, it is preferred to have this shaping opening formed entirely in the casting wheel so that maximum support, namely support on three sides, will be provided for the bands during the cooling thereof. The shaping opening may have a cross-section equal to that desired in the finished band, in which case the band coming from the casting wheel may be used without further treatment. Satisfactory results may also be obtained by having the shaping opening an integral number of times wider than the finished band and slitting the resultant band to produce several bands of the desired width. The casting wheel and the compression roll may be artificially cooled by passing a cooling fluid in heat exchange relation thereto. In certain cases, however, a sufficient degree of cooling is obtained by the escape of heat to the atmosphere and no artificial cooling is required.

This invention may be employed to prepare bands from all types of thermoplastic materials. For example, bands may be prepared from polycarboxamides, polysulfonamides, polyurethanes, polyureas, etc. Bands may also be prepared from organic derivatives of cellulose materials including cellulose esters such as cellulose acetate, cellulose propionate, cellulose butyrate, cellulose acetate-propionate, cellulose acetate-butyrate, cellulose acetate-stearate and the benzyl ester of cellulose; cellulose ethers such as ethyl cellulose; and cellulose ether-esters. Plasticizers, dyes, pigments and other materials capable of modifying the properties of the finished band may be added to the thermoplastic materials, as desired.

Figure 2:
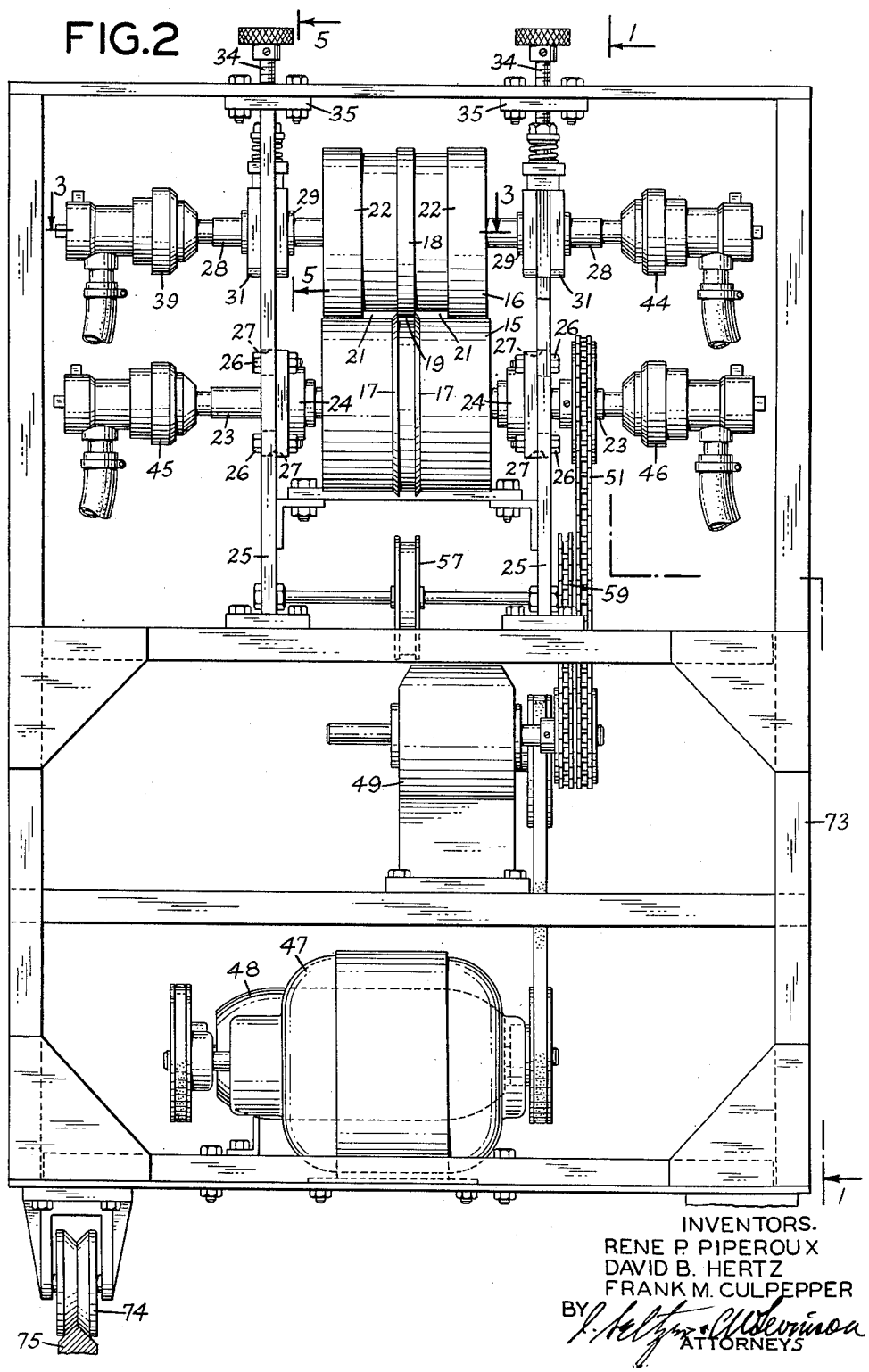
Figure 3:
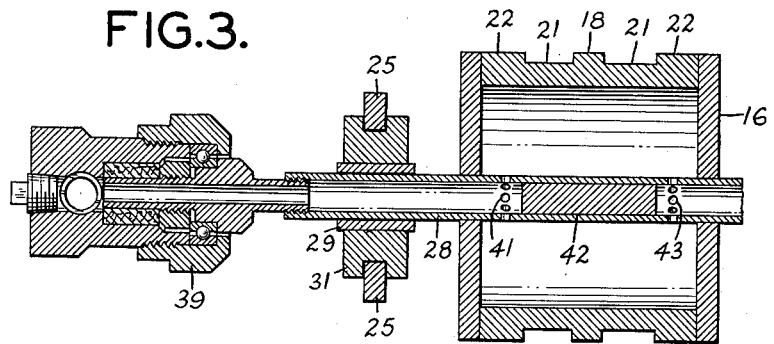
Figure 4:
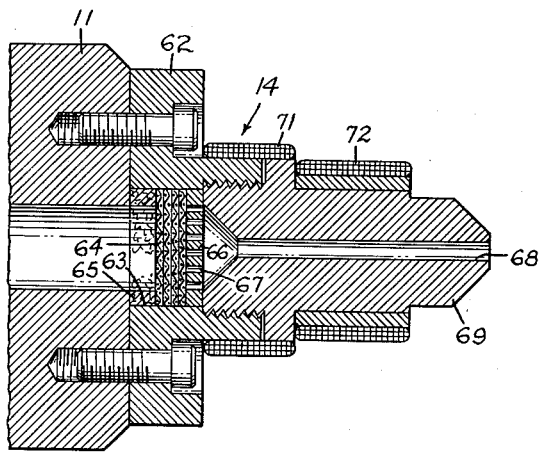
Figure 5:
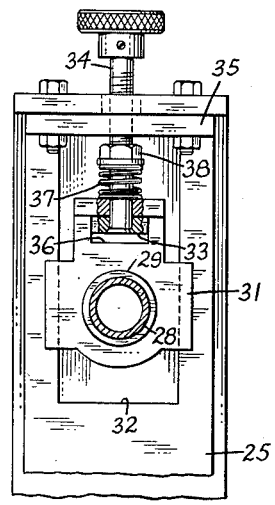

A preferred embodiment of our invention is illustrated in the accompanying drawings in which Fig. 1 is a side elevational view, taken on the line 1—1 in Fig. 2 in the direction of the arrows, showing the general assembly of the apparatus, Fig. 2 is a front elevational view, taken on the line 2—2 in Fig. 1 in the direction of the arrows, showing the drive and mounting for the casting wheel and the compression roll, Fig. 3 is a detail view, on an enlarged scale, taken on the line 3—3 in Fig. 2 in the direction of the arrows, showing the mounting and the structure of the compression roll, Fig. 4 is a detail view, on an enlarged scale, taken on the line 4—4 in Fig. 1 in the direction of the arrows, showing the aperture through which the thermoplastic material is forced, and Fig. 5 is a detail view, on an enlarged scale, taken on the line 5—5 in Fig. 2 in the direction of the arrows, showing the mounting for the compression roll.

Like reference numerals refer to like parts throughout the several views of the drawings.

Referring now to the drawings, the reference numeral 11 designates a screw extruder into which a thermoplastic material is fed through a hopper 12 and from which a band 13 of said thermoplastic material is forced through an extrusion die 14. As the band 13 of thermoplastic material emerges from the extrusion die 14, it is passed, while still in the plastic state, between a casting wheel 15 and a compression roll 16. The casting wheel 15 has knife edges 17 extending circumferentially thereof, which trim excess thermoplastic material from the band 13 and between which a circumferential ridge 18 on the compression roll 16 is fitted to define a rectangular shaping opening 19, whose width is determined by the spacing of the knife edges 17. The compression roll 16 also has circumferential grooves 21 on each side of the ridge 18 to receive the excess thermoplastic material that is trimmed from the band 13 by the knife edges 17. The ends 22 of the compression roll 16, which bear against the casting wheel 15, space the ridge 18 from the surface of the casting wheel 15 thereby determining the height of the shaping opening 19. The relationship of the diameter of the ridge 18 and the diameter of the ends 22 of the compression roll 16 is such that the peripheral speed of the ridge 18 is the same as the peripheral speed of the surface of the casting roll 15 between the knife edges 17 so that no shearing stresses are applied to the band 13 as it passes through the shaping opening 19.

The casting wheel 15 is mounted on a hollow shaft 23 extending therethrough, which shaft 23 is journalled for free rotation in bearings 24 that are adjustably fastened to plates 25 by bolts 26 extending through elongated apertures 27 in said plates. This permits the casting wheel 15 to be adjusted vertically until the shaping opening 19 is positioned properly with respect to the extrusion die 14. Like the casting wheel 15, the compression roll 16 is mounted on a hollow shaft 28 extending therethrough, which shaft 28 is journalled for free rotation in bearings 29 carried by pillow blocks 31 that slidably engage the edges of slots 32 in the plates 25. The pillow blocks 31 are supported by bars 33 fastened to the lower ends of bolts 34 that are in threaded engagement with plates 35. The bars 33 fit into apertures 36 in the pillow blocks 31, which apertures 36 are larger than the bars to permit the pillow blocks 31 to move vertically. The pillow blocks 31 are normally pressed downwardly until the compression roll 16 contacts the casting wheel 15 by means of springs 37 that encircle the bolts 34 and are held in compression by nuts 38 in threaded engagement with said bolts. However, if a hard foreign material should enter the shaping opening 19 or the line of contact between the ends 22 of the compression roll 16 and the surface of the casting wheel 15, the springs 37 permit the compression roll 16 to move upwardly until the foreign material has passed through said opening or line of contact thereby avoiding any damage to either the casting wheel 15 or the compression roll 16.

The compression roll 16 may be artificially cooled by means of a fluid which is introduced into the shaft 28 through a revolving joint 39. After flowing along the shaft 28, the cooling fluid passes into the compression roll 16 through apertures 41 extending through the shaft at one side of the plug 42. The cooling fluid flows through the compression roll 16 and passes back into the shaft 28 through apertures 43 extending through the shaft 28 at the other side of the plug 42. The cooling fluid is then discharged through a revolving joint 44. The casting wheel 15, which has an internal structure identical to that of the compression roll 16, may be artificially cooled in a similar manner, with the cooling fluid entering through a revolving joint 45 and leaving through a revolving joint 46.

A motor 47 drives the casting wheel 15 through a variable speed drive 48, gear reducer 49 and sprocket chain 51, which engages a sprocket wheel 52 fastened to the shaft 23. The casting wheel in turn drives the compression roll 16 through frictional contact therewith. As the casting wheel 15 rotates it carries the band 13 under a rubber retaining roller 53, which prevents any movement of the band 13 between the knife edges 17 until the thermoplastic material of which the band is formed has set. The retaining rollers 53 is mounted in an L-shaped bracket 54, which is pivotally supported on a bolt 55 extending therethrough and is adjustably urged toward the casting wheel 15 by means of a bolt 56. After passing under the retaining roller 53, the band 13 is drawn from the casting wheel 15, passes under an idler roller 57 and is wound onto a take-up reel 58 which is driven through a slipping clutch (not shown) from the gear reducer 49 by means of a sprocket chain 59 and a sprocket wheel 61.

The extrusion die 14, through which the thermoplastic material is forced, comprises a plate 62 having a cavity 63 therein in which a number of stainless steel filter screens 64 are positioned between an annular spacer 65 and a backing plate 66 provided with apertures 67 extending therethrough. The apertures 67 open into a rectangular aperture 68 in a die tip 69, which is in threaded engagement with the plate 62. Heaters 71 and 72 wrapped around the extrusion die 14 maintain the die at the proper temperature to insure that the thermoplastic material leaving the rectangular aperture 68 will be sufficiently plastic, when passing through the shaping opening 19, to assume the contours of said opening readily. To render the extrusion die 14 accessible for inspection and replacement, the framework 73 upon which the casting wheel 15 and compression roll 16 are mounted, is equipped with grooved casters 74 which ride on angles 75, permitting the entire assembly to be rolled away from the extrusion apparatus 11 without moving out of alignment therewith.

It is to be understood that the foregoing detailed description is given merely by way of illustration and that many variations may be made therein without departing from the spirit of our invention.

Having described our invention, what we desire to secure by Letters Patent is:

1. Process for preparing bands from thermoplastic material, which comprises shaping the thermoplastic material into a band containing an excess of said material, further shaping the band of thermoplastic material between a pair of shaping elements while it is in the plastic state, trimming the excess thermoplastic material from the band during said further shaping, positively holding the band, after it is shaped and trimmed, in contact with one of said pair of shaping elements, cooling the band while it is positively held against said one shaping element until the thermoplastic material is set and the band is no longer subject to deformation by mechanical stress, and then removing the shaped band from said shaping element.

2. Apparatus for preparing bands from thermoplastic material, which comprises means for shaping the thermoplastic material into a band of given cross-section, means including a casting wheel for further shaping the band while the thermoplastic material is in the plastic state into a band of smaller cross-section, means for trimming excess thermoplastic material from the band during such further shaping, means for cooling the band, and means adjacent to the casting wheel for positively holding the band against the casting wheel until the thermoplastic material is set and the band is no longer subject to deformation by mechanical stress.

3. Apparatus for preparing bands from thermoplastic material, which comprises a die having an aperture therein, means for forcing a thermoplastic material through said aperture, a rotatable casting wheel, knife edges extending circumferentially of the casting wheel, a compression roll adjacent said casting wheel and defining a shaping opening with said knife edges for receiving and further shaping the thermoplastic material as it leaves said aperture, circumferential grooves adjacent said knife edges for receiving excess thermoplastic material trimmed from the band by said knife edges, and a retaining roller adjacent to said casting wheel for preventing any escaping movement of the band contained between the knife edges until the thermoplastic material is set and the band is no longer subject to deformation by mechanical stress.

4. Apparatus for preparing bands from thermoplastic material, which comprises a die having an aperture of given cross-section therein, means for forcing a thermoplastic material through said aperture, means for heating said die so that the thermoplastic material leaving said aperture is in the plastic state, a rotatable casting wheel, knife edges extending circumferentially of the casting wheel, a compression roll adjacent said casting wheel and defining a shaping opening with said knife edges of smaller cross-sectional area than said aperture for receiving and further shaping the thermoplastic material as it leaves said aperture, means yieldably urging said casting wheel and said compression roll against each other, circumferential grooves in said compression roll adjacent said knife edges for receiving excess thermoplastic material trimmed from the band by said knife edges, means for cooling said casting wheel and compression roll for setting the thermoplastic material, and a retaining roller adjacent to said casting wheel for preventing any escaping movement of the band contained between the knife edges until the thermoplastic material is set and the band is no longer subject to deformation by mechanical stress.

RENE P. PIPEROUX.
DAVID B. HERTZ.
FRANK M. CULPEPPER.

REFERENCES CITED

The following references are of record in the file of this patent:

UNITED STATES PATENTS

| Number | Name | Date |
|---|---|---|
| 16,215 | Reynolds | Dec. 9, 1856 |
| 328,339 | Reuhl | Oct. 13, 1885 |
| 361,822 | Hohre et al. | Apr. 26, 1887 |
| 559,466 | Sparr | May 5, 1896 |
| 790,918 | Du Pont | May 30, 1905 |
| 1,297,482 | Little | Mar. 18, 1919 |
| 1,544,305 | Fisher | June 30, 1925 |
| 1,568,820 | Fenlason, Jr. | Jan. 5, 1926 |
| 2,163,757 | MacLean et al. | June 27, 1939 |
| 2,382,177 | Schanz | Aug. 14, 1945 |